(12) United States Patent
Shigeki (10) Patent No.: US 6,775,760 B1
(45) Date of Patent: Aug. 10, 2004

(54) INTEGRATED CIRCUIT AND RECORDING MEDIUM ON WHICH DATA ON INTEGRATED CIRCUIT IS RECORDED

(75) Inventor: Kenji Shigeki, Nara (JP)

(73) Assignee: Roran Co., Osaka (JP)

(*) Notice: Subject to any disclaimer, the term of this patent is extended or adjusted under 35 U.S.C. 154(b) by 0 days.

(21) Appl. No.: 09/555,173

(22) PCT Filed: Sep. 28, 1999

(86) PCT No.: PCT/JP99/05265

§ 371 (c)(1),
(2), (4) Date: May 25, 2000

(87) PCT Pub. No.: WO00/19329

PCT Pub. Date: Apr. 6, 2000

(30) Foreign Application Priority Data

Sep. 28, 1998 (JP) ............................................. 10-273774

(51) Int. Cl.7 .......................... G06F 15/80; G06F 15/82; G06F 9/38
(52) U.S. Cl. ............................. 712/37; 712/36; 712/27; 712/219; 716/16; 716/17
(58) Field of Search ............................ 712/37, 36, 227, 712/210, 27, 219; 703/24, 21; 710/104, 103, 303, 313, 305; 716/16, 17, 18

(56) References Cited

U.S. PATENT DOCUMENTS

| | | | | |
|---|---|---|---|---|
| 5,734,872 A | * | 3/1998 | Kelly | 710/104 |
| 5,787,007 A | * | 7/1998 | Bauer | 716/16 |
| 5,968,161 A | * | 10/1999 | Southgate | 712/37 |
| 6,256,691 B1 | * | 7/2001 | Moroz et al. | 710/103 |

OTHER PUBLICATIONS

Electronics, vol. 43, No. 7 (Jul., 1998), K. Sakamaki, "CPLD/FPGA Most Advanced Technology; ASIC Strategy using IC Descriptive Linguistics", pp. 81–83.
Bulletin of Electricity and Telecommunications University, vol. 10, No. 2, (1997), Katsura Tsyoshi et al., "Design and Implementation of 32 byte RISC Processor MinIPS", pp. 71–78y.
Wescon Conference Record, (1993), Bruce Kleinman and Bill Cox, "A High–Speed RISC CPU Using the QL16*24 FPGA", pp. 245–250.
Technology Research Report prepared by the Institute of Electronics, Information and Communication Engineers, vol. 95, No. 25 (ICD95), (1995) Hiroshi Inoue et al., "Didactic RISC Type Micro processor DLX–FPGA and Rapid System Prototyping", pp. 71–78.

* cited by examiner

Primary Examiner—Daniel H. Pan
(74) Attorney, Agent, or Firm—Jordan and Hamburg LLP

(57) ABSTRACT

In an integrated circuit, an FPGA (2) has functions of a CPU core (5), and includes a user's circuit and so forth. This configuration allows the number of implemented components such as peripheral circuit chips to be decreased, and cost to be reduced. The integrated circuit is configured such that the CPU core (5), peripheral circuits thereof, and a system bus (8) are stored as logic data in a PROM (3), and the FPGA (2) performs functions as the CPU core (5), peripheral circuits (6) (7), and system bus (8) based on the logic data. Therefore, the CPU core (5), peripheral circuits (6) (7), and system bus (8) which have desired functions can be obtained according to contents of the logic data stored in the PROM (3). Further, a user can readily extend and change functions of the CPU core (5) by retrofitting a separate circuit to the system bus (8).

4 Claims, 7 Drawing Sheets

Instruction order

INTEGRATED CIRCUIT AND RECORDING MEDIUM ON WHICH DATA ON INTEGRATED CIRCUIT IS RECORDED

FIELD OF THE INVENTION

This invention relates to an integrated circuit, and particularly relates to an art such that a field programmable gate array (FPGA) performs functions as a central processing unit (CPU) core and a peripheral device thereof.

BACKGROUND OF THE INVENTION

Conventionally, as to a logic integrated circuit (IC), there have been known a general-purpose logic IC and an application specific IC (ASIC). The general-purpose logic IC, which can be mass-produced, and cost-effective, includes devices functions of which are completed by users by themselves, such as a microprocessor, a programmable logic device (PLD). As to said PLD, there have been a programmable logic array (PLA), an FPGA, and the like. In the FPGA, the user places logic module configured by a basic logic circuit and unconnected wiring to a chip, and completes the wiring with program elements, thereby obtaining a desired function. The microprocessor is generally called a system large-scale integration (LSI) in that a CPU is integrated on an LSI chip, and embodied as a combination of a logic circuit and a memory circuit. Further, as to this kind of microprocessor, there has been known an RISC (reduced instruction set computer) in which high performance is achieved by simplifying command processing and hardware.

However, predetermined functions are previously integrated in the above-mentioned microprocessor which includes a general-purpose CPU core, and users use limited functions among them, wherein it is difficult to change the configuration in order to serve specific purposes. Furthermore, the microprocessor is configured by a CPU core and a number of chips, which complicates the configuration with many implemented components, so that problems have arisen in reliability.

SUMMARY

This invention is made to solve the above-mentioned problems. One object of the present invention is to provide an integrated circuit as an RISC processor, wherein an FPGA itself has functions as a CPU core, and includes a user's circuit and the like, thereby performing as a system LSI having functions desired by users without employing a conventional CPU core, and wherein implemented components such as chips of peripheral circuits are decreased in number, thereby allowing costs to be reduced.

In order to achieve the above-mentioned objects, the present invention provides an integrated circuit equipped with a field programmable gate array and a memory device, wherein a CPU core and peripheral circuits connected thereto are stored as logic data in the memory device, and wherein the field programmable gate array performs functions as the CPU core and the peripheral circuits based on contents stored in the memory device.

In the above, functions of the CPU core and peripheral circuits can be changed according to the logic data stored in the memory device, which allows a system LSI to be designed easily. Furthermore, since the field programmable gate array performs functions as the CPU core and peripheral circuits, the number of chips to be implemented is decreased.

The above-mentioned constitution can be constructed such that the peripheral circuits include a system bus to which a user can connect an arbitrary circuit. Therefore, the user can readily extend and change functions of the CPU core by retrofitting a desired circuit.

Further, the above-mentioned configuration can be constituted such that the arithmetic processing performed by the CPU core has a structure that a dummy step is incorporated into steps of fetch, decode, execution, memory and write-back, wherein these steps are divided into three stages: a first stage for carrying out in order of fetch and decode, a second stage for carrying out in order of execution and memory, and a third stage for carrying out in order of dummy and write-back, wherein the processing is carried out in order of first, second and third stages, and wherein, every time one stage is completed, another arithmetic processing is started, and simultaneous operations of different arithmetic processing are executed parallel in the three-stage pipeline construction. In this configuration, in the parallel operation of multiple arithmetic processing, the fetch cycle and memory cycle are not simultaneously carried out, and generates no situation in which these cycles compete with each other for a same memory. Therefore, this configuration can perform the parallel processing without a cash memory.

Furthermore, according to the present invention, a computer readable recording medium has data to be written in a recording device of an integrated circuit, composed of a field programmable gate array and a memory device. The data is logic data for making the field programmable gate array perform functions as the CPU core and peripheral circuits connected to the CPU core.

The above-mentioned constitution makes it possible to easily design a system LSI such that a computer reads out the data in the recording medium, and the field programmable gate array performs functions as the CPU core and peripheral circuits thereof in the computer.

According to the above-mentioned configuration, a computer-readable recording medium includes a system bus in peripheral circuits, wherein a user can connect an arbitrary circuit to the system bus.

Furthermore, in the above, the logic data includes a configuration in which arithmetic processing executed by the CPU core has a structure that a dummy step is incorporated into steps of fetch, decode, execution, memory and write-back, wherein these steps are divided into three stages: a first stage for carrying out in order of fetch and decode, a second stage for carrying out in order of execution and memory, and a third stage for carrying out in order of dummy and write-back, wherein the processing is carried out in order of first, second and third stages, and wherein, every time one stage is completed, another arithmetic processing is started, and simultaneous operations of different arithmetic processing are executed parallel in the three-stage pipeline construction.

DETAILED DESCRIPTION OF THE PREFERRED EMBODIMENT OF THE PRESENT INVENTION

Figure 1:
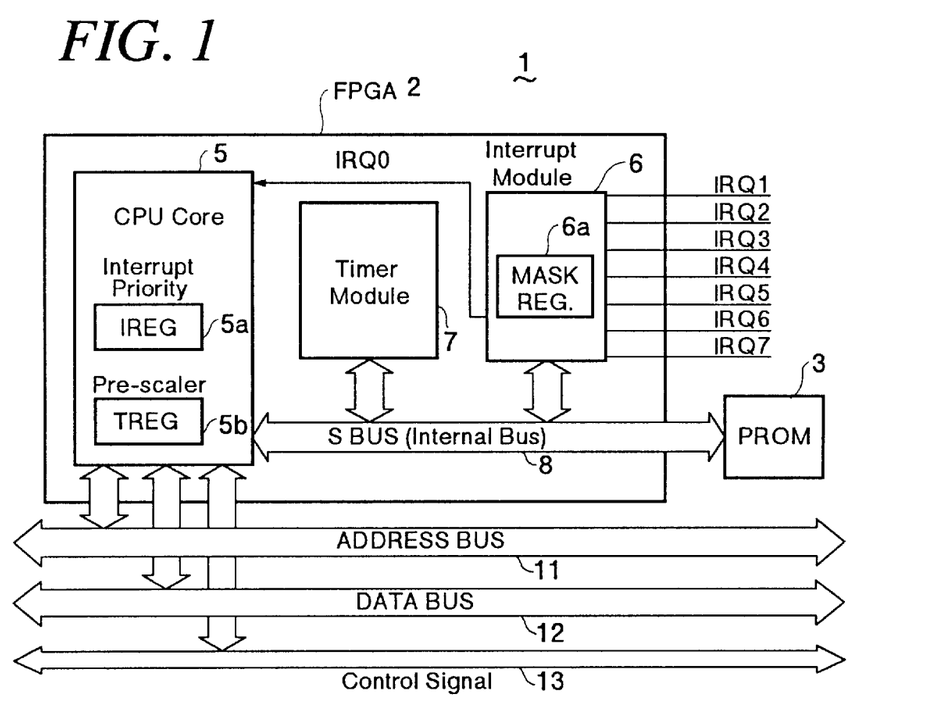
FIG. 1 is a block diagram showing a configuration of an integrated circuit according to one embodiment of the present invention.

An embodiment of the present invention is explained below with reference to the drawings. As shown in FIG. 1, an integrated circuit 1 according to the present invention, which is an RISC processor having an FPGA 2, and a PROM 3, constructs a system LSI. The FPGA 2 is controlled based on logic data which is stored in the PROM 3. Thus, the FPGA 2 performs various kinds of logic functions according to the logic data which is written in the PROM 3. In the present embodiment, the FPGA 2 is configured so as to perform functions as a CPU core 5, an interrupt module 6, a timer module 7 and a system bus (SBUS or internal bus) 8 which is connected to the CPU core 5. The CPU core 5 is provided with an index register (IREG) 5a for indicating interrupt priority, and a prescaler (TREG) 5b. The interrupt module 6 is provided with a mask register 6a. The CPU core 5 is connected to the interrupt module 6 and timer module 7 through the system bus 8. Further, the CPU core 5 makes each of connections with an address bus 11, a data bus 12, a control bus 13, and exchanges data with the PROM 3.

Figure 2:
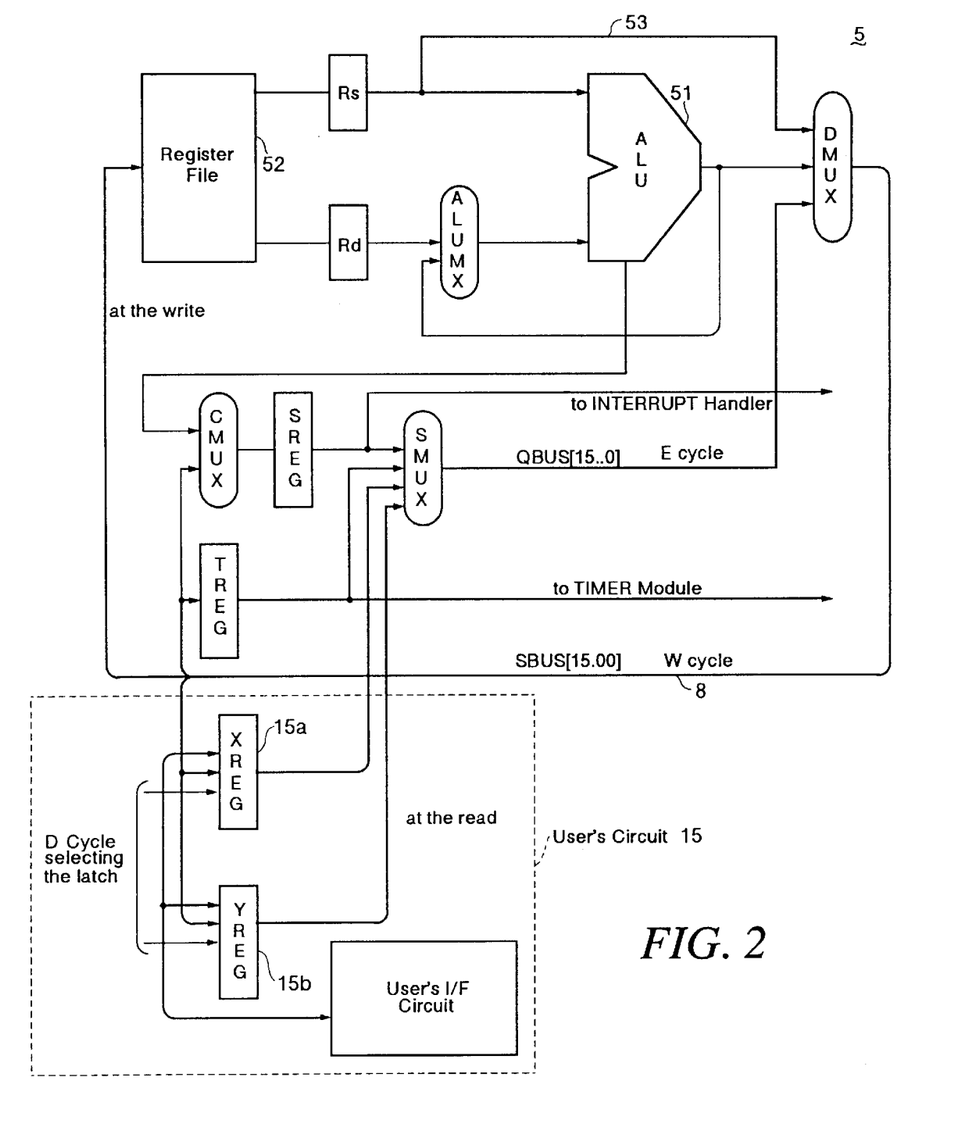
FIG. 2 is a view showing datapath when a user's circuit is connected to a CPU core of the integrated circuit.

Referring to FIG. 2, explanation is given of a connection made by a user between an arbitrary circuit and the system bus 8. The user can arbitrarily connect a desired circuit 15 to the system bus 8. FIG. 2 shows a datapath in such a case. The desired circuit 15 is provided by storing logic data to the PROM 3. In the present embodiment, the user's circuit 15 latches a processed result into an XREG 15a and a YREG 15b, and has the CPU core 5 process the result (reading operation). This constitution in which the system bus 8 is provided for making a connection of the user's circuit 15, allows the user to readily extend the functions of the CPU core 5. Therefore, the CPU core 5 speedily performs processing which cannot have been performed without using a number of commands in a multi-programming control executed by conventional software programs. The CPU core 5 is provided with an ALU 51 for performing four fundamental arithmetic and logic arithmetic functions, a register file 52 for temporally storing commands, data and the like, and a bypass circuit 53 between the ALU 51 and register file 52 (later described in detail).

The logic data to be stored in the above-mentioned PROM 3 can be easily generated by using a tool such as CAD (computer-aided design). For example, the user creates a circuit diagram having desired functions by using CAD for constructing a desired CPU, and then, converts the generated circuit diagram into HDL (hardware description language) with data conversion software, thereby obtaining logic data which allows the FPGA to perform functions as the CPU. The logic data is provided to the user in a storage medium (a recording medium in claims) which can be read out by a computer, such as a floppy disk, a CD-ROM, a DVD. The data stored in the storage medium is read out in CAD for arbitrarily changing the logic data on CAD, or adding a user's desired circuit as a peripheral circuit of the CPU. Thus, the storage medium assists the user in a simplification of designing a system LSI.

Figure 3:
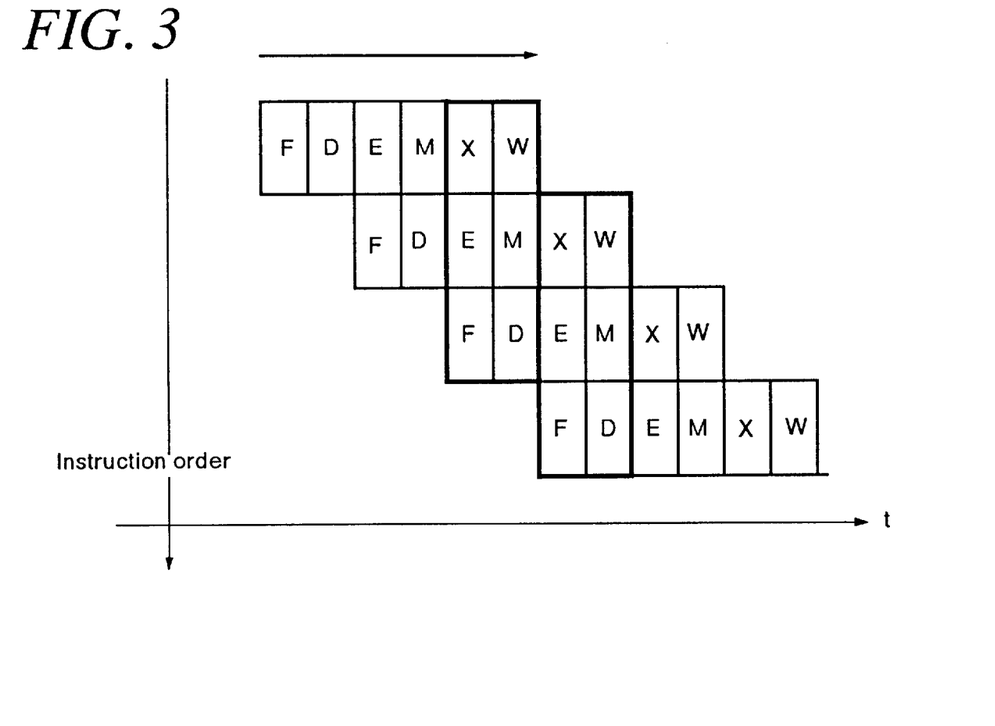
FIG. 3 is a view showing a parallel operation of a three-stage pipe in a pipeline control.
Figure 4:
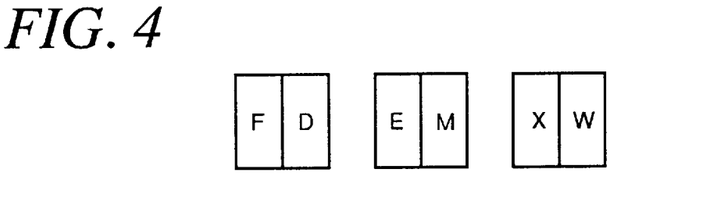
FIG. 4 is a view showing three stages in arithmetic processing of said CPU core.

Next, arithmetic processing performed by the CPU core 5 will be explained with reference to FIGS. 3 and 4. The arithmetic processing by the CPU core 5 is carried out by a pipeline control in a three-stage pipe construction. In the present embodiment, each of arithmetic processing is composed of six steps: fetch (F), decode (D), execution (E), memory (M), write back (W) and dummy (X). As shown in FIG. 4, the arithmetic processing is divided into three stages which are carried out in order from first to third stage: first stage for carrying out in order of F-D, second stage for carrying out in order of E-M, and third stage for carrying out in order of X-W. Then, as shown in FIG. 3, operation processing is newly started every time one stage is ended. In this procedure, {F, E, X} and {D, M, W} are always operated parallel in the three-stage pipe. Accordingly, a fetch cycle and a memory cycle are not simultaneously carried out, and thus generates no situation that both of these cycles compete with each other for a same memory.

Figure 9:
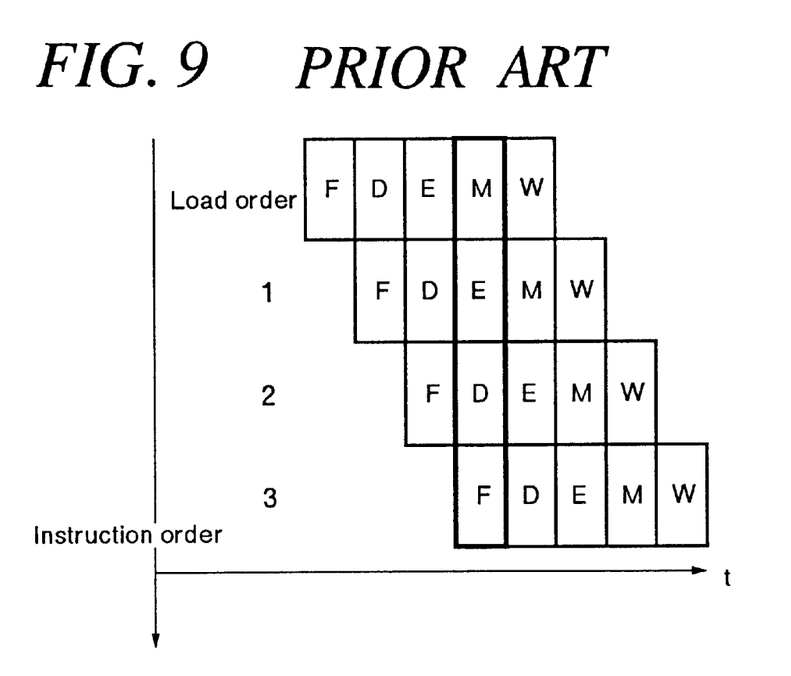
FIG. 9 is a view showing a parallel operation of a five-stage pipe in a conventional pipeline control.

Here, a conventional pipeline control of five-stage pipe construction will be explained with reference to FIG. 9. The conventional five-stage pipe construction is composed of 5 steps: fetch (F), decode (D), execution (E), memory (M) and write back (W). In this construction, each of steps is carried out in order of F-D-E-M-W, and arithmetic processing is newly started every time one step is ended. After that, each of steps in multiple arithmetic processing is parallel carried out. In this control, as shown in FIG. 9, the fetch cycle and memory cycle are simultaneously carried out, so that they compete with each other for a same memory. Therefore, it is necessary to provide a cash memory composed of a program cash memory and a data cash memory. However, in the present invention as mentioned above, the fetch cycle and memory cycle do not compete with each other for a same memory, so that it is unnecessary to provide a cash memory, and possible to effectively use the FPGA.

Figure 5A:
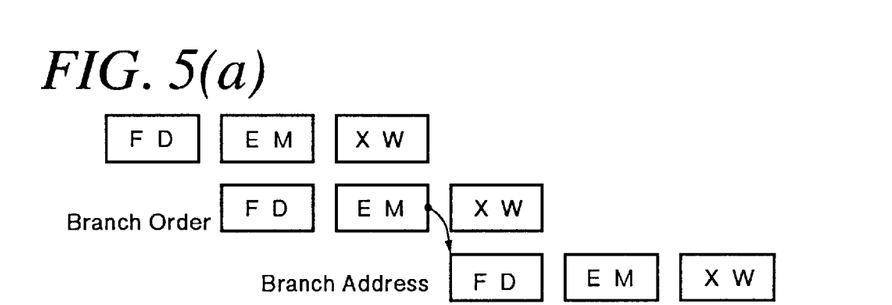
FIG. 5(a) is a view showing a flow stalled for obtaining branch address.
Figure 5B:
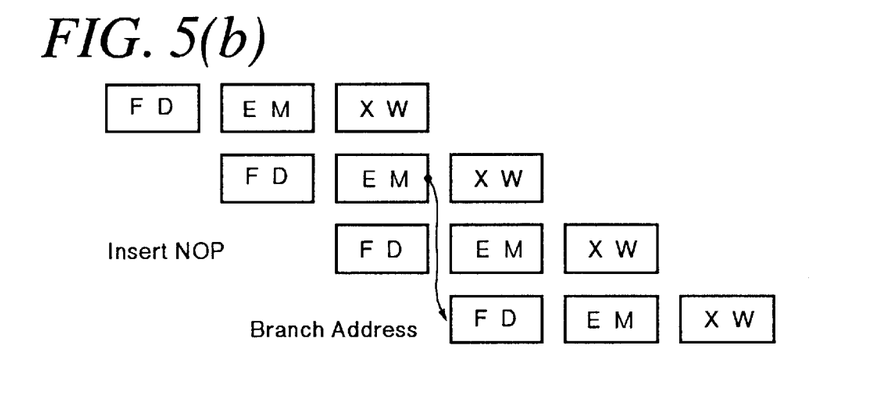
FIG. 5(b) is a view showing a flow of an NOP insertion of branch delay.
Figure 6A:
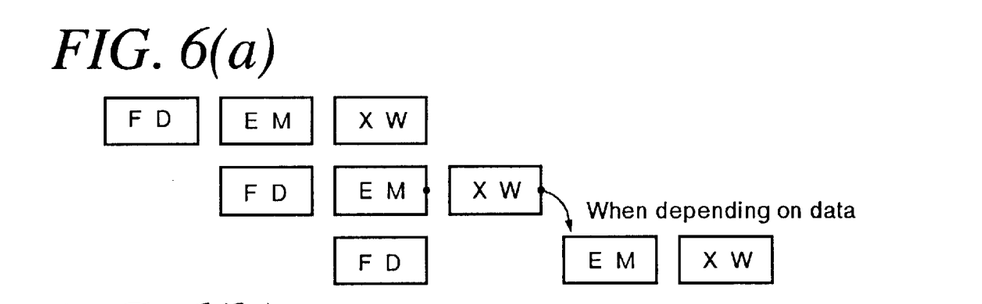
FIG. 6(a) is a view showing a flow stalled for data dependence.
Figure 6B:
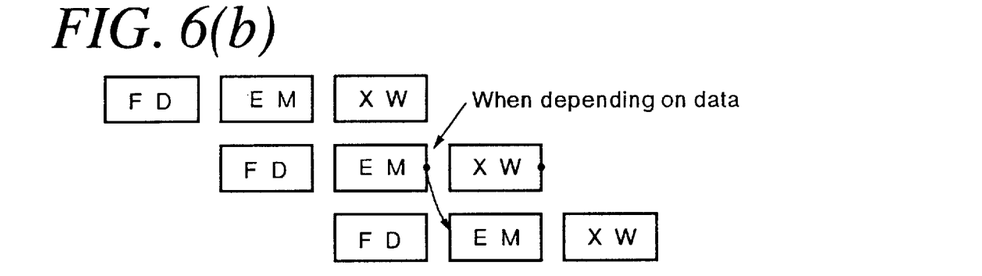
FIG. 6(b) is a view showing a flow in a case that a bypass circuit is provided between an ALU and a register file.

Now, referring to FIGS. 5 and 6, a solution of a structural hazard and a data hazard in the above-mentioned pipeline control will be explained. In the above-mentioned pipeline control, calculations of branch address is carried out in execution (E) shown in FIG. 5(a). Therefore, it is necessary to stall instructions for obtaining the branch address. In order to avoid this situation, NOP shown in FIG. 5(b) is automatically inserted in the pipeline control of the present invention. Further, in the pipeline control of the present invention, the stall as shown in FIG. 6(a) may be generated. In order to avoid the stall generating, the bypass circuit 53 is placed between the ALU 51 (refer to FIG. 2) and register file 52 inside the CPU core 5. FIG. 6(b) shows a flow when the bypass circuit 53 is placed in the ALU 51. The pipeline control of the present invention carries out operations in two cycles.

Figure 7:
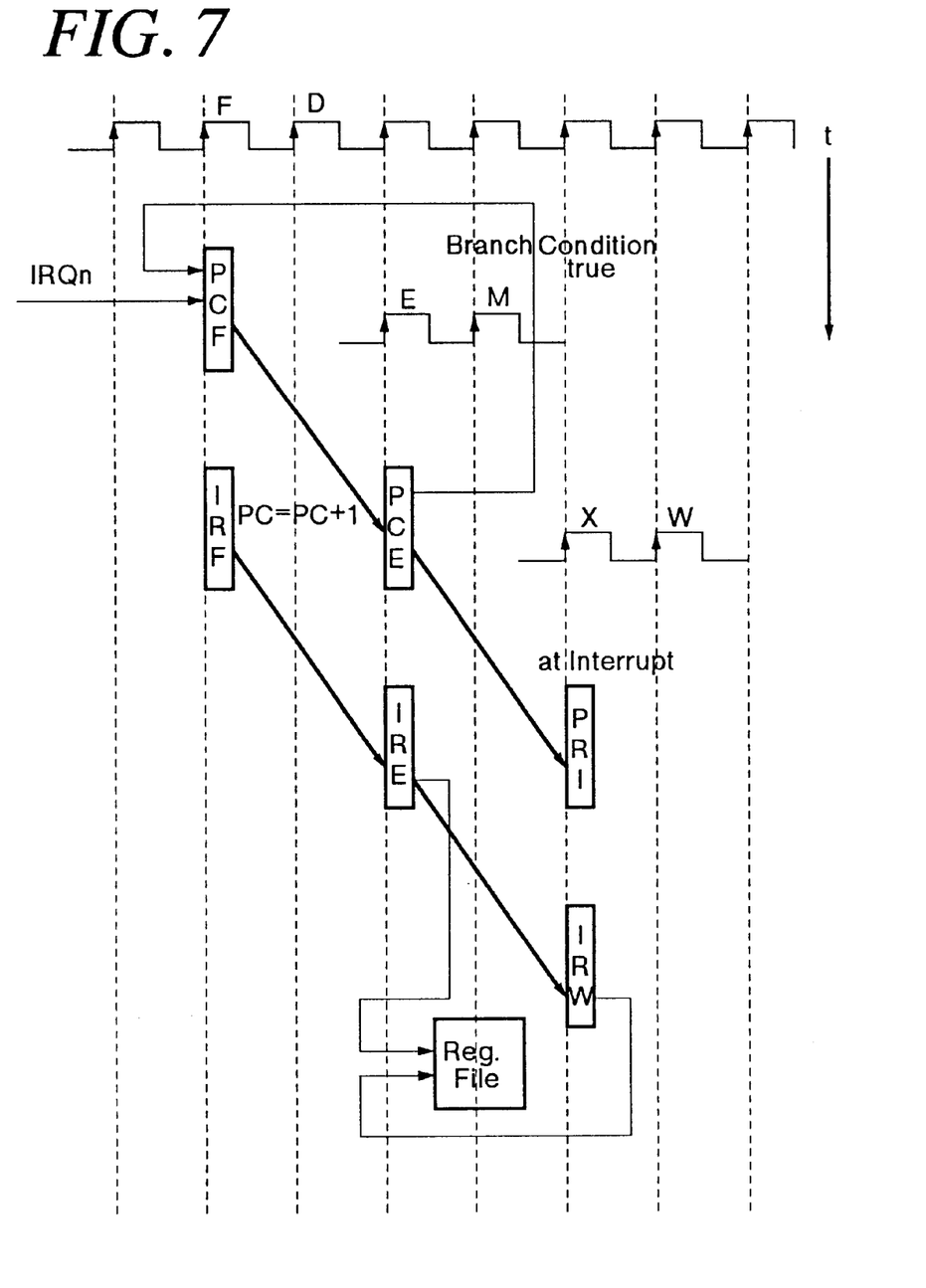
FIG. 7 is a view showing a flow of a pipeline control in the arithmetic processing of the CPU core.
Figure 8:
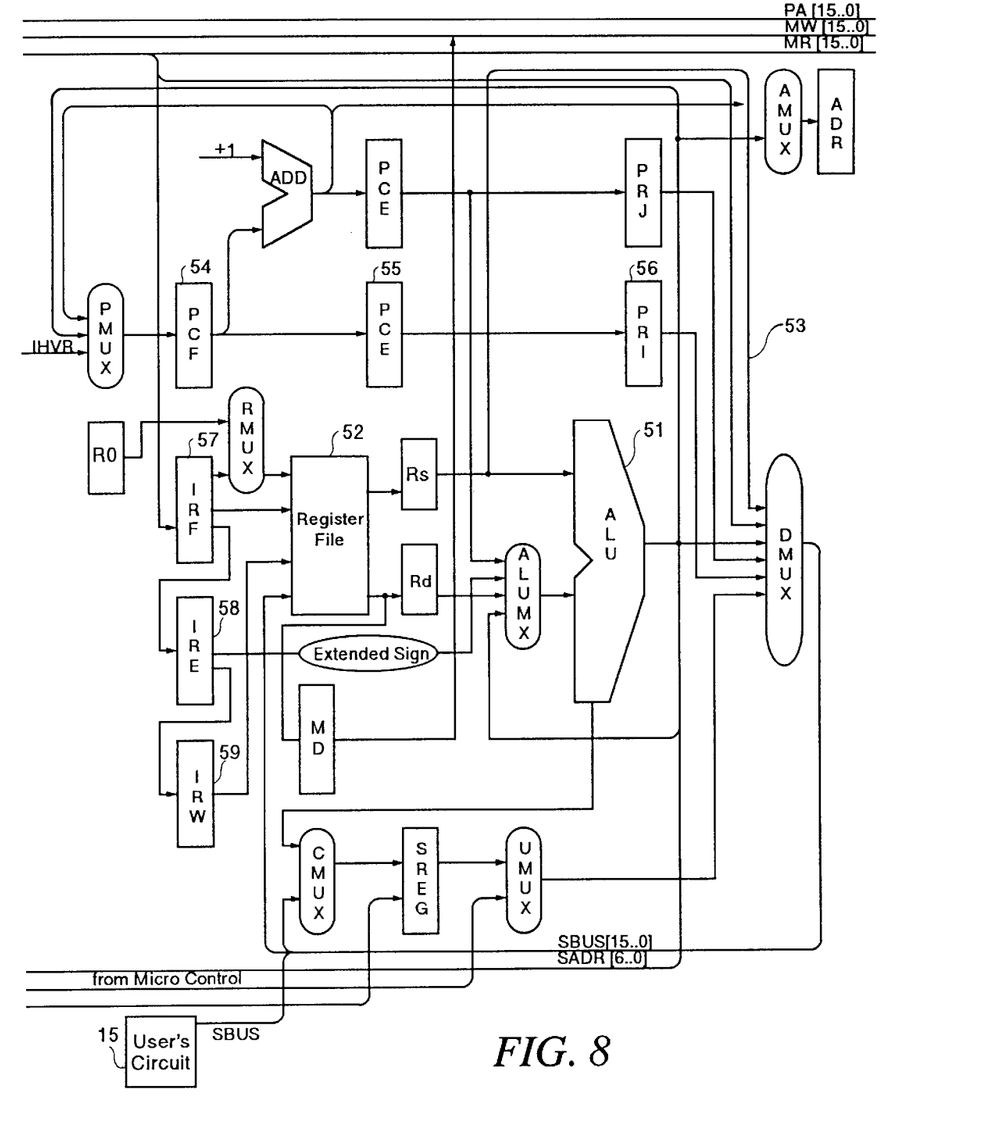
FIG. 8 is a view showing datapath of the CPU core.

With reference to FIGS. 7 and 8, the above-mentioned pipeline control is concretely explained. As shown in FIG. 7, after PCF (program counter fetch cycle, 54 in FIG. 8) is carried out in the first stage (F-D), PCE (program counter execution, 55 in FIG. 8) is carried out in the second stage (E-M). At the same time that the second stage is started, next arithmetic processing is newly started, and IRF (instruction register fetch cycle, 57 in FIG. 8) is carried out in the first stage (F-D) of the newly started processing. That is, PCE and IRF are parallel processed. Then, when the third stage (X-W) is started, and PRI (program register interrupt, 56 in FIG. 8) is carried out in the earliest arithmetic processing, the second stage (E-M) is started and IRE (instruction register execution, 58 in FIG. 8) is carried out in the later arithmetic processing. That is, the F-D processing alone is always repeatedly executed in a section for carrying out the first stage in the CPU core 5, and the same also goes for sections for carrying out the second and third stages. After the second stage (E-M) in the later arithmetic processing is ended, the third stage (X-W) is started and IRW (instruction register write back, 59 in FIG. 8) is carried out.

As described above, the integrated circuit 1 of the present invention has a configuration wherein the FPGA 2 performs functions as the CPU core 5 and the peripheral circuits thereof (interrupt module 6, timer module 7 and system bus 8) based on the logic data stored in the PROM 3, so that, providing the FPGA 2 eliminates the need for mounting chips of the CPU core and peripheral circuits thereon, which allows number of members implemented on the integrated circuit 1 to be decreased. This simplifies the configuration of the integrated circuit 1, and enhances its reliability. Also, in the FPGA 2, the system bus 8 is provided so as to connect to the CPU core 5, so that the user can retrofit a circuit having desired functions to the system bus 8. This makes it possible to extend and change the functions of the CPU core 5, and allows the user to easily configure the system LSI equipped with the CPU core having desired functions.

Moreover, the integrated circuit 1 of the present invention has a configuration wherein the arithmetic processing in the CPU core 5 is carried out in the pipeline control of the three-stage construction in which the fetch cycle and memory cycle are not simultaneously executed in the parallel operation of the multiple arithmetic processing, thereby generating no situation that the fetch cycle and memory cycle compete with each other for a same memory. Therefore, it is unnecessary to provide a cash memory, and possible to effectively use the FPGA 2.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. For example, although the peripheral circuits of the CPU core 5 are the interrupt module 6, and timer module 7 in the above-mentioned embodiment, other circuits can also be applied not limited to these modules.

As mentioned above, according to the present invention, the functions of the CPU core and peripheral circuits can arbitrarily be changed by changing settings of the logic data, so that the system LSI including the CPU core equipped with the desired functions can easily be produced. Therefore, this constitution makes it possible to easily produce a CPU core having the equal function as a CPU core which has gone out of production, and to effectively use user's own data. The CPU core, which is provided as the logic data, can be produced in small quantity, so that the production costs can be reduced in comparison with in the case of the conventional CPU core which has to be produced in large quantity. Furthermore, the FPGA performs the functions as the peripheral circuits, which can decrease number of chips to be implemented on the integrated circuit, thereby simplifying the structure and enhancing the reliability.

Moreover, a user can readily extend and change functions of the CPU core by retrofitting a desired circuit to the system bus. Therefore, the user can easily operate the configuration of the CPU core in order to make the CPU core perform desired functions. Further, processing which has been carried out only by using a number of commands in multiple programming control of conventional software, can be speedily performed in the CPU core by extending and changing functions of the CPU core.

Moreover, even in case of performing parallel operations of multiple arithmetic processing, the configuration of the present invention does not simultaneously carry out the fetch cycle and memory cycle, thereby preventing the situation in which these cycles compete with each other for a same memory. Therefore, the parallel operation can be performed without a cash memory, which makes it possible to reduce the cost, and use the FPGA efficiently.

Furthermore, this configuration can assist in designing a system LSI which makes a computer read out data in a recording medium.

What is claimed is:

1. An integrated circuit, comprising:
    a field programmable gate array and a memory device; and
    logic data for effecting functions of a CPU core and peripheral circuits connected thereto being stored into said memory device such that said field programmable gate array performs functions as said CPU core and peripheral circuits based on contents stored in said memory device,
    wherein arithmetic processing executed by said CPU core has a structure that a dummy step is incorporated into steps of fetch, decode, execution, memory and write-back, wherein said steps are divided into three stages: a first stage for carrying out in order of fetch and decode, a second stage for carrying out in order of execution and memory, and a third stage for carrying out in order of dummy and write-back, wherein the processing is carried out in order of first, second and third stages, and wherein, every time one stage is completed, another arithmetic processing is started, and simultaneous operations of different arithmetic processing are executed parallel in the three-stage pipeline construction.

2. A computer-readable recording medium in which data to be written in a memory device of an integrated circuit composed of a field programmable gate array and a memory device is stored, said data including:
    logic data for configuring the field programmable gate array to effect functions of a CPU core; and
    logic data for configuring the field programable gate array to effect functions of peripheral circuits connected to the CPU core effected by the field programmable gate array,
    wherein said logic data for configuring the field programmable gate array to effect functions of a CPU core includes effecting a configuration in which arithmetic processing executed by the CPU core has a structure that a dummy step is incorporated into steps of fetch, decode, execution, memory and write-back,
wherein these steps are divided into three stages: a first stage for carrying out in order of fetch and decode, a second stage for carrying out in order of execution and memory, and a third stage for carrying out in order of dummy and write-back, wherein the processing is carried out in order of first, second and third stages, and wherein, every time one stage is completed, another arithmetic processing is started, and simultaneous operations of different arithmetic processing are executed parallel in the three-stage pipeline construction.

3. An integrated circuit comprising:

a field programmable gate array and a memory device;

logic data for effecting functions of a CPU core and peripheral circuits connected thereto being stored into said memory device such that said field programmable gate array performs functions as said CPU core and peripheral circuits based on contents stored in said memory device; and said peripheral circuits effected by said field programmable gate array being provided with a system bus effected by said field programmable gate array, and configured such that a user connects an arbitrary circuit to said system bus, wherein arithmetic processing executed by said CPU core has a structure that a dummy step is incorporated into steps of fetch, decode, execution, memory and write-back, wherein said steps are divided into three stages: a first stage for carrying out in order of fetch and decode, a second stage for carrying out in order of execution and memory, and a third stage for carrying out in order of dummy and write-back, wherein the processing is carried out in order of first, second and third stages, and wherein, every time one stage is completed, another arithmetic processing is started, and simultaneous operations of different arithmetic processing are executed parallel in the three-stage pipeline construction.

4. A computer-readable recording medium in which data to be written in a memory device of an integrated circuit composed of a field programmable gate array and a memory device is stored, said data including:

logic data for configuring the field programmable gate array to effect functions of a CPU core; and logic data for configuring the field programable gate array to effect functions of peripheral circuits connected to the CPU core effected by the field programmable gate array, wherein said peripheral circuits effected by said field programmable gate array include a system bus effected by said field programmable gate array to which a user connects an arbitrary circuit, and wherein said logic data includes a configuration in which arithmetic processing executed by the CPU core effected by said field programmable gate array has a structure that a dummy step is incorporated into steps of fetch, decode, execution, memory and write-back, wherein these steps are divided into three stages:

a first stage for carrying out in order of fetch and decode, a second stage for carrying out in order of execution and memory, and a third stage for carrying out in order of dummy and write-back, wherein the processing is carried out in order of first, second and third stages, and wherein, every time one stage is completed, another arithmetic processing is started, and simultaneous operations of different arithmetic processing are executed parallel in the three-stage pipeline construction.

* * * * *